(No Model.)
E. DOWNS.
WINDMILL.
No. 476,875. Patented June 14, 1892.
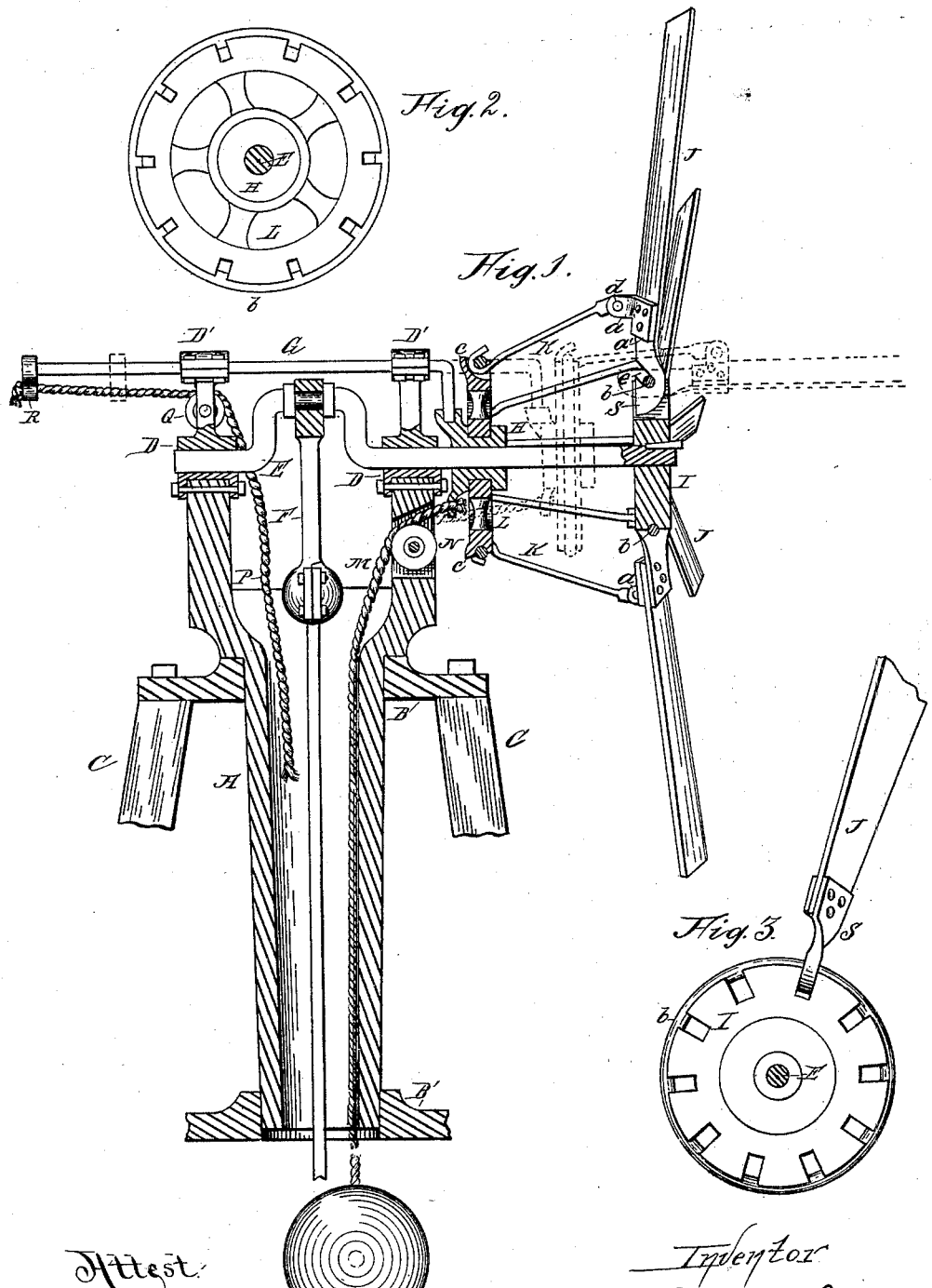
Attest:
S. W. Brainerd.
Frank L. Clark.
Inventor
Eugene Downs.
By J. M. St. John
Atty.

UNITED STATES PATENT OFFICE.

EUGENE DOWNS, OF VINTON, IOWA, ASSIGNOR OF ONE-HALF TO J. T. CHRISTIE, OF SAME PLACE.

WINDMILL.

SPECIFICATION forming part of Letters Patent No. 476,875, dated June 14, 1892.

Application filed July 12, 1890. Renewed January 11, 1892. Serial No. 417,756. (No model.)

*To all whom it may concern:*

Be it known that I, EUGENE DOWNS, a citizen of the United States, residing at Vinton, in the county of Benton and State of Iowa, have invented certain new and useful Improvements in Windmills; and I do hereby declare the following to be a full, clear, and exact description of the invention, such as will enable others skilled in the art to which it appertains to make and use the same.

The object of my invention is to produce a simple, strong, and efficient windmill capable of automatic adjustment, according to the force of the wind.

The invention consists in the construction, combination, and arrangement of parts, as hereinafter fully set forth and claimed.

In the accompanying drawings, forming a part of this specification, Figure 1 is a central vertical section of the operative parts of a windmill embodying my invention. Fig. 2 is a front elevation of the sliding spider, which shifts the position of the vanes; and Fig. 3 is a similar view of the main spider or head, showing a single vane in position therein.

Similar letters of reference indicate corresponding parts.

Referring to the drawings, A is the main pivot-iron, on which the wheel is mounted and through which the usual pump-rod passes. This pivot is mounted in bearings B and B' in a common and well-known manner, these bearings being suitably attached to a tower C. In suitable bearings D D at the upper end of the pivot-iron is mounted the cranked axle E, communicating motion to the pump-rod through the medium of the connecting-rod F. The bearings D D are preferably made detachable, so as to be removed when necessary in the repair of the mill. The upper halves of these bearings or boxes are extended upwardly, and at the upper extremity form supplemental bearings D' D' to receive the slide-rod G, connecting with a sleeve H, which slides freely on the crank-shaft outside the bearing D. At the end of the crank-shaft nearest this sleeve is secured a spider I, forming the hub of the wheel. To this spider are pivoted a series of vanes J J, so as to swing in radial lines. From suitable lugs $a\ a$, attached to or forming a part of these vanes, connecting-rods K K extend to and engage with a spider L, adapted to revolve freely on the sleeve H. To the lower part of this sleeve is attached a cord or chain M, which passes over a sheave N, mounted in one of the upwardly-extending arms of the pivot A. This cord passes down through the inside of the pivot and at its lower end is provided with a weight O, the size of which may be adjusted to the requirements of the wheel. The gravity of this weight, as will be seen, tends to draw the vanes into the normal position shown in full outline. The counteractive force of the wind, when in excess of the weight, throws the vanes inwardly, as indicated by the dotted lines, it being understood that the wind acts on the wheel from the side next the tower. Ordinarily the motion of the wheel is regulated automatically by the conjoint action of the wind and the weight, and the wheel is in this respect self-governing. When, however, it is necessary to stop the wheel entirely, it is thrown out of the wind by means of a cord P, passing over a sheave Q, mounted on the other arm of the pivot-iron and attached to a suitable collar or stud R on the slide-rod G.

In Figs. 2 and 3 are illustrated certain improvements in the construction of the spiders. These are in the nature of wheels or disks, with notches in the periphery to receive in the one case the vane-iron S and in the other the hooked end of the connecting-rod K. In the case of the spider I the sides of the notches form lateral bearings for the vane-irons, and thus hold them in true radial position. The notches in the other spider L should also inclose the connecting-rods K K snugly on both sides, so as to prevent undue twist thereon as the spider revolves on the sleeve H. In the periphery of the spider (either one, since both are alike in this respect) is formed a shallow groove, and in this groove is secured a continuous ring $b$. In practice this ring is shrunk upon the spider, the effect of which is not only to make a simple and efficient pivot for each one of the vane-irons or connecting-rods, but to materially strengthen the spider itself, which is of course made of cast-iron. The construction is simpler, cheaper, and calculated to secure greater accuracy in the bearings than any arrangement of individual bearings with which I am familiar in this connection.

The spider L is provided with a flange c, which forms a shoulder for the end of the connecting-rods K K. These are necessarily hooks, as shown, and without the shoulder c to bear against their ends would be inefficient to push the vanes forward to a closed position. The connecting-rods are quickly disengaged by removing the bolts d d, connecting them with the lugs a a.

In order to connect with the continuous pivot-ring b, the vane-iron must have a notch or opening e in one side. This is on the inner side, as shown, the force of the wind being such as to seat the vane-iron in its bearing at all times. The notch, furthermore, is made diagonal, so that it is impossible to detach the vane without throwing it back (toward the tower) of the position shown in Fig. 1, and this can only be done by disconnecting the connecting-rods K K. This is done in a moment, however, by the removal of the bolt d, above mentioned. The vane-iron inwardly from this pivot, should have considerable width, so as to afford a good lateral bearing for the vane to keep it in true radial position with respect to the spider.

Having thus described my invention, what I claim as new, and desire to secure by Letters Patent, is—

1. In a windmill, the herein-described spider or head I, having parallel-sided notches in the periphery to receive and form lateral bearings for the vane-irons, a shallow peripheral groove, and a continuous ring of round iron shrunk into said groove to form pivots for said vane-iron and strengthen the spider, as specified.

2. In a windmill, the herein-described spider L, having notches in the periphery to receive a pivoted member, a shallow peripheral groove with a continuous ring of round iron shrunk therein, and a flange c a short distance from the ring to abut upon the end of the pivoted member, substantially as and for the purpose set forth.

3. In a wind-mill, the combination of the spider I, having notches for vane-irons therein, and a continuous pivot-ring b, shrunk into a shallow peripheral groove, and the vane-iron S, having an upwardly-inclined opening therein adapted to admit the pivot-ring as the vane-iron is tilted backwardly and downwardly, as described.

In testimony whereof I affix my signature in presence of two witnesses.

EUGENE DOWNS.

Witnesses:
   E. J. CHRISTIE,
   D. J. GILLESPIE.